(No Model.)
H. R. ALBRECHT.
GRAIN METER.
No. 367,775.  Patented Aug. 9, 1887.
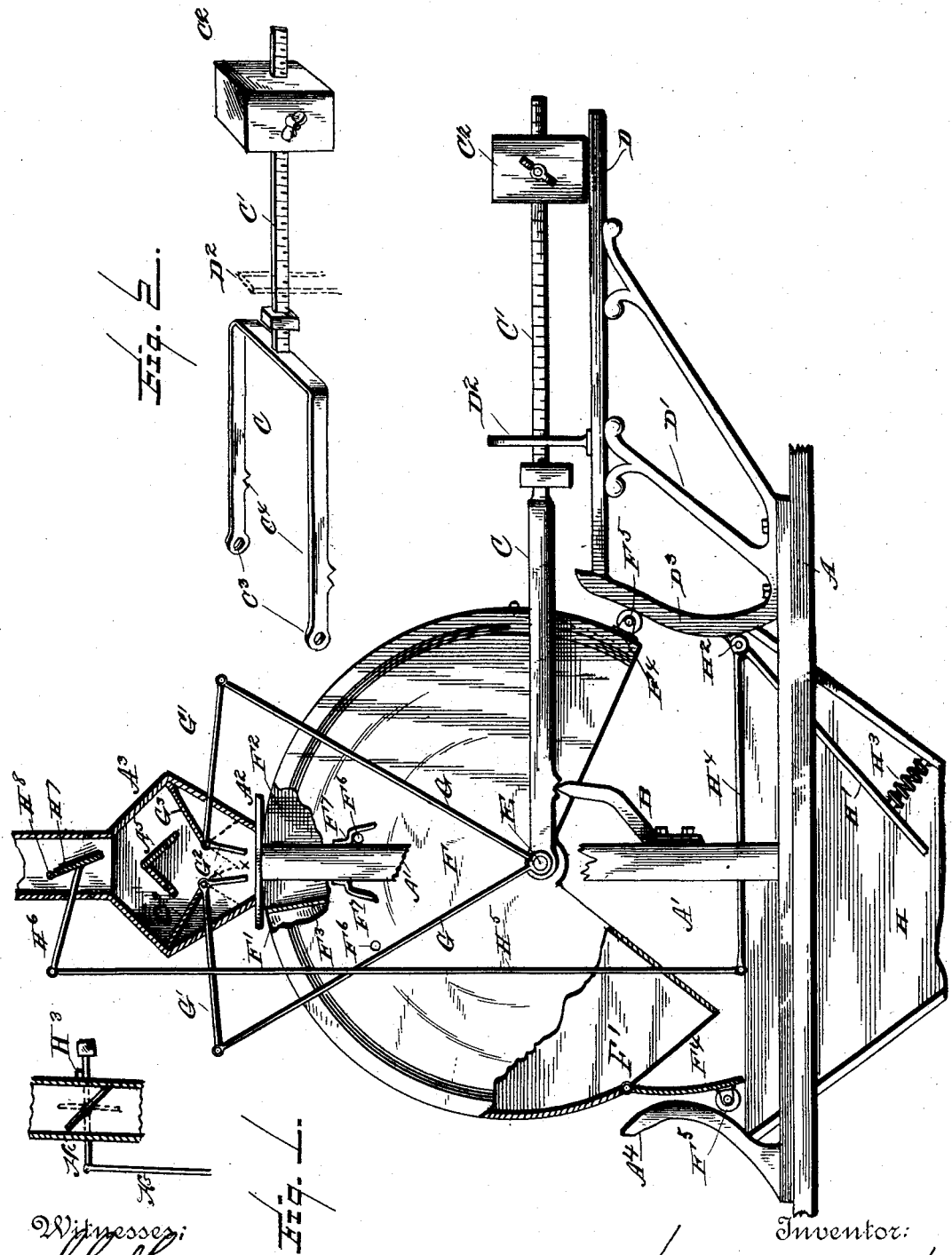
Witnesses:
J. C. Hills,
W. S. Auvall
Inventor:
Henry R. Albrecht
By his Attorney
E B Stocking

United States Patent Office.

HENRY R. ALBRECHT, OF MOLINE, ILLINOIS.

GRAIN-METER.

SPECIFICATION forming part of Letters Patent No. 367,775, dated August 9, 1887.

Application filed February 2, 1887. Serial No. 226,270. (No model.)

*To all whom it may concern:*

Be it known that I, HENRY R. ALBRECHT, a citizen of the United States, residing at Moline, in the county of Rock Island, State of Illinois, have invented certain new and useful Improvements in Grain-Meters, of which the following is a specification, reference being had therein to the accompanying drawings.

This invention has relation to grain-meters; and the object is to provide a meter of the above class which will accurately, rapidly, and automatically weigh predetermined quantities of grain and deliver the same into any receptacle placed thereunder and automatically control the supply in accordance with its capacity to deliver the grain weighed.

With these general objects in view, the invention consists in certain features of construction, hereinafter specified, and particularly pointed out in the claims.

Referring to the drawings, Figure 1 represents a side elevation of a grain-meter constructed in accordance with my invention, portions thereof being shown in section, and Fig. 2 is a perspective of the scale, bail, and beam.

Like letters indicate like parts in both figures of the drawings.

A represents the base, at each side of which are mounted standards $A'$, connected at their tops by a platform, $A^2$, which is perforated, and supports a grain hopper or chute, $A^3$.

At a suitable distance from the bottom, and rigidly secured to the standards $A'$ at each side of the frame-work, are brackets B, pointed at their upper ends, forming the fulcra for the weighing-bail C and its beam $C'$, respectively. A suitable scale is formed on the beam $C'$, upon which is mounted a movable weight, $C^2$, provided with a set-screw for securing the weight at any graduation of the scale. A bracket, D, having suitable supports, $D'$, bolted to the base A, serves as a downward stop and support for the weight $C^2$, and is provided with a bail, $D^2$, for limiting the upward movement of said weight and beam. The bail C is provided with journals $C^3$ at its outer ends and is loosely mounted upon a shaft, E. Notches $C^4$ in each arm of the bail are adapted to rest on the pointed bracket or fulcrum B, at which point said bail is supported.

Upon the shaft E is loosely and rotatably mounted the grain-drum F, divided in two compartments, $F'$ $F^2$, by the partition $F^3$, passing from the center to the periphery of said drum. At the lower end of the compartments $F'$ $F^2$ are arranged hinged doors $F^4$, provided with rollers $F^5$, adapted to come into contact with ways $A^4$ $D^3$, the former being formed at one end of the machine and the latter being formed in this instance as a portion of the supports $D'$ of the bracket D.

Fixed loosely upon the shaft E and radiating from one of its ends are rods G, extending up above the drum and pivoted to rods $G'$, the opposite ends of which are rigidly fixed to the pivots of shutters or valves $G^2$, hinged to fixed shelves $G^3$ in the hopper $A^3$, in which and above the shutters is arranged a deflector, $A^5$. Upon the sides of the drum F and at suitable points are pins $F^6$, which project from the drum, so as to come into contact with the standards $A'$ and be embraced by catches $F^7$, secured to the sides of the uprights or standards.

Having thus far described the construction, the operation is as follows: Taking the device as shown in Fig. 1—that is, in a position where the compartment $F'$ has been filled and is delivering grain into the receptacle H, secured to the base A, which is perforated, permitting communication from the drum through the base with said receptacle H—it will be seen that as this operation is progressing—namely, emptying grain from the compartment $F'$ into said receptacle—the partition $F^3$ will have passed by the opening in the base $A^2$ of the hopper $A^3$, and communication will be opened between said hopper and the compartment $F^2$, it being understood that the weight has been set upon the scale at the desired graduation-mark. The grain passes from the hopper into the compartment $F^2$ until the weight thereof is sufficient to cause the drum to drop vertically a sufficient distance to release a pin, $F^6$, from engagement with a latch, $F^7$, when said drum will swing upon its pivot until the opposite pin $F^6$ comes into contact with the standard $A'$ and the drum reaches a point where the way $D^3$ permits the door $F^4$ to swing open by gravity, when the grain will pass from said compartment $F^2$ into the receptacle H. This downward movement of the compartment $F^2$ of the drum will cause the opposite compartment F' thereof to swing on shaft E until its pin F⁶ comes into contact with the standard A', and by reason of the weight C² the drum will rise until said pin passes up and is embraced by the latch F⁷. In the downward movement of the drum the rods G, being pivoted to the shaft, will close the hinged shutters G² together, as shown by dotted lines X, thus shutting off the supply when the predetermined quantity as controlled by weight C² has been delivered into either compartment.

H' represents a table or shelf pivoted, as at H², in this instance to the bracket-support D³; and interposed between said shelf and one side of the receiver H is a coiled spring, H³, having a tendency to press the shelf away from the side wall of the receiver.

Rigidly connected with the pivot of the shelf is a rod, H⁴, to which is pivoted a rod, H⁵, extending up above the hopper A³, and pivotally connected with a rod, H⁶, rigidly fixed to a cut-off, H⁷, pivoted at H⁸ in the supply-pipe of the hopper or chute, which supply-pipe leads from any grain-receptacle. It will now be seen that should the grain accumulate within the receiver H faster than it is passed through into any receptacle placed thereunder, the weight of the surplus grain will cause the table H' to move toward the wall of said receiver and draw on the rods H⁵ H⁶ and close the cut-off H⁷, and by reason of its pivot being a distance from one wall of the supply-pipe the supply is but partially cut off or reduced in quantity. Now, when the grain has passed from the receiver H into any receptacle thereunder, and the table ceases to be pressed by the weight of said grain, the spring H³ will cause it to resume its normal position, as shown, which action will return the rods H⁴ H⁵ H⁶ to their normal position and cause the cut-off to be opened or thrown down, as shown.

In the rising movement of the drum F the weight will be caused to assume the position shown by reason of the bail C being fulcrumed upon the brackets B at each side of the apparatus. This downward movement of the weight is arrested when it comes into contact with the bracket D, thus preventing any sudden jar of the apparatus or strain upon the bail, fulcra, or scale-beam. When the compartment F² is filled, the bail and scale-beam are elevated, and its upward movement is arrested by the limiting-bail D², mounted on the bracket D. It is understood that the supports for the bracket D, the uprights or standards A', and the way A⁴ are duplicated upon the opposite sides of the apparatus, as may also be the rods for limiting and controlling the supply of grain, if necessary.

At the left of Fig. 1 I have shown a modification of the cut-off mechanism. In this instance I extend the rod H⁶ beyond its pivot and provide the same with a weight, it being understood that the cut-off H⁷ is pivoted at its center. By this arrangement the spring H³ is done away with, and a stop is arranged above the arm H⁶.

Having described my invention and its operation, what I claim is—

1. In a grain-meter, the combination of a bail and drum mounted upon a shaft, said bail being fulcrumed upon a bracket mounted upon the base and provided with a scale-beam at its forward end, and pins arranged upon said drum, in combination with latches connected to the frame-work and opening downward to receive the pins upon the drum, substantially as specified.

2. The combination of the hopper A³, the drum F, and the receiver H, with the table H', having the interposed spring H³, hinged as at H², the rods H⁴, H⁵, and H⁶, and the cut-off H⁷, hinged at H⁸, substantially as specified.

3. The combination of the drum F, having the stops F⁶, with the uprights A', provided with downwardly-opening latches A⁷, and with the shaft E, bail C, and fulcra B, substantially as specified.

In testimony whereof I affix my signature in presence of two witnesses.

HENRY R. ALBRECHT.

Witnesses:
JOHN DOWNING,
M. H. GRIFFITH.